United States Patent
Schramm

(10) Patent No.: US 11,648,720 B2
(45) Date of Patent: May 16, 2023

(54) METHOD FOR PRODUCING PLASTIC PRODUCTS BY MEANS OF AN EXTRUDER, AND SHAPING SYSTEM

(71) Applicant: X-PER EXTRUDER PERFORMANCE GMBH, Bedburg (DE)

(72) Inventor: Jens Schramm, Schwerin (DE)

(73) Assignee: X-PER EXTRUDER PERFORMANCE GMBH, Bedburg (DE)

( * ) Notice: Subject to any disclaimer, the term of this patent is extended or adjusted under 35 U.S.C. 154(b) by 20 days.

(21) Appl. No.: 15/517,771

(22) PCT Filed: Oct. 7, 2015

(86) PCT No.: PCT/DE2015/000489
§ 371 (c)(1),
(2) Date: Apr. 7, 2017

(87) PCT Pub. No.: WO2016/055043
PCT Pub. Date: Apr. 14, 2016

(65) Prior Publication Data
US 2017/0305056 A1    Oct. 26, 2017

(30) Foreign Application Priority Data
Oct. 7, 2014   (DE) ..................... 10 2014 014 583.2

(51) Int. Cl.
*B29C 48/03*    (2019.01)
*B29C 48/25*    (2019.01)
(Continued)

(52) U.S. Cl.
CPC .......... *B29C 48/2692* (2019.02); *B29B 7/428* (2013.01); *B29B 7/603* (2013.01);
(Continued)

(58) Field of Classification Search
CPC . B29C 47/10; B29C 40/0874; B29C 48/2692; B29C 2948/92485;
(Continued)

(56) References Cited

U.S. PATENT DOCUMENTS

| | | | |
|---|---|---|---|
| 5,098,275 A * | 3/1992 | Kasai | B29C 45/18 425/145 |
| 6,358,547 B1 * | 3/2002 | Dupont | A23P 30/25 264/245 |

(Continued)

FOREIGN PATENT DOCUMENTS

| | | |
|---|---|---|
| DE | 1604354 | 9/1970 |
| DE | 1604389 | 9/1970 |

(Continued)

OTHER PUBLICATIONS

Preliminary Examination Report dated Sep. 2, 2016, from International Application No. PCT/DE2015/000489, 8 pages (English translation not yet provided).

(Continued)

*Primary Examiner* — Ryan M Ochylski
(74) *Attorney, Agent, or Firm* — Meunier Carlin & Curfman LLC

(57) ABSTRACT

The invention relates to a process for the production of articles, exemplarily a plastic article, by means of an extruder (1) to which a first plastic composition of a first main component and at least one associated minor component is supplied from a first group of dosing stations (21, 24). According to the invention, during the production time of a first production order there is prepared a second group of dosing stations (31, 33) at the extruder for a second production order for which a second plastic composition of a second main component and at least one associated minor component that is different from the first plastic composition has to be supplied to the extruder. After completion of the (Continued)

first production order it is reset to the second production order by terminating the supply of the first plastic composition by closing a first shut-off device (8) and starting the supply of the second plastic composition by opening a second shut-off device (8').

12 Claims, 2 Drawing Sheets

(51) Int. Cl.
| | |
|---|---|
| *B29C 48/285* | (2019.01) |
| *B29B 7/42* | (2006.01) |
| *B29B 7/60* | (2006.01) |
| *B29B 7/74* | (2006.01) |
| *B29B 7/48* | (2006.01) |

(52) U.S. Cl.
CPC .......... *B29B 7/7485* (2013.01); *B29C 48/286* (2019.02); *B29C 48/288* (2019.02); *B29B 7/488* (2013.01); *B29C 48/03* (2019.02); *B29C 2948/9298* (2019.02); *B29C 2948/92333* (2019.02); *B29C 2948/92485* (2019.02); *B29C 2948/92828* (2019.02)

(58) Field of Classification Search
CPC ............ B29C 9248/9298; B29C 48/17; B29C 48/175; B29C 48/297; B29B 7/428; B29B 7/603; B29B 7/7485

See application file for complete search history.

(56) References Cited

U.S. PATENT DOCUMENTS

| | | | | |
|---|---|---|---|---|
| 10,207,448 | B2* | 2/2019 | Backmann | .............. B29B 7/603 |
| 2004/0206246 | A1* | 10/2004 | Bortone | .................. A23P 30/20 |
| | | | | 99/353 |
| 2005/0087906 | A1* | 4/2005 | Caretta | ............... B29C 48/2886 |
| | | | | 264/211 |
| 2006/0157887 | A1* | 7/2006 | Schwaiger | .............. B29C 48/30 |
| | | | | 264/210.2 |
| 2008/0290537 | A1* | 11/2008 | Bacher | ...................... B01F 7/18 |
| | | | | 264/37.1 |
| 2010/0317769 | A1* | 12/2010 | Graf | .................... B01F 13/1027 |
| | | | | 524/1 |
| 2014/0023743 | A1* | 1/2014 | Donohoo | ................ B29C 47/10 |
| | | | | 425/377 |
| 2015/0367553 | A1* | 12/2015 | Backmann | ............ B29C 48/271 |
| | | | | 425/145 |

FOREIGN PATENT DOCUMENTS

| | | | |
|---|---|---|---|
| DE | 2847431 | | 5/1980 |
| DE | 3506635 | | 8/1986 |
| DE | 10018321 | | 1/2001 |
| DE | 102013100812 | | 7/2014 |
| GB | 950093 | * | 2/1964 |
| JP | S57178734 | | 11/1982 |
| JP | S62212121 | | 9/1987 |
| JP | H0724899 | | 1/1995 |
| JP | 2000167840 | | 6/2000 |
| WO | 2007101359 | | 9/2007 |
| WO | 2013026506 | | 2/2013 |
| WO | 2014127918 | | 8/2014 |

OTHER PUBLICATIONS

Preliminary Examination Report dated Jan. 25, 2017, from International Application No. PCT/DE2015/000489, 7 pages (English translation not yet provided).

International Search Report dated Feb. 11, 2016, from International Application No. PCT/DE2015/000489, 16 pages (English translation not yet provided).

* cited by examiner

A-A

METHOD FOR PRODUCING PLASTIC PRODUCTS BY MEANS OF AN EXTRUDER, AND SHAPING SYSTEM

BACKGROUND OF THE INVENTION

(a) Technical Field

The invention relates to a process for the production of articles, in particular plastic articles as well as a shaping plant.

More particularly, the invention relates to a process for the production of plastic articles by means of an extruder that is supplied with a first plastic composition of a first main component and at least one associated minor component from a first group of dosing stations.

(b) Prior Art

In the plastic industry nowadays on each extruder there is found a dosing station having a suction conveyor. This applies both for mono- and multilayer plants, both for blown film plants and other plastic shaping plants, and both for a blend component and several components as loading materials for dosing. The extruder drives and plant controls are supplied with information via suitable sensors on the dosing and weighing stations to control the extruder speed and to keep the output on the desired throughput.

In continuously operating plants during each plant resetting between completion of a production order and starting a new production order the raw materials have to be completely or partially discharged from the suction conveyors and dosing containers and the new raw materials have to be charged. In case of a three-layer plant this takes up to an hour. The operator has no opportunity to charge the raw materials in advance and supply them to the machine. During the resetting there are obtained up to 750 kg of waste depending on the configuration of the plant and one loses effective production time.

With discontinuously operating plants there is obtained no or little waste, but one also loses production time. DE 35 06 635 C2 discloses a process having the features of the preamble of patent claim 1. In a feed funnel to which all the components are supplied there is a level indicator that selectively blocks or enables the supply of the components by controlling the speed of rotation application facilities. This allows a switching from a minor component to another minor component and thus, a change in the composition of the material leaving the extruder without breakdown, e.g. for a change in color.

WO 2007/101359 A2 discloses a process for the production of articles of a pasty mass of a main component and minor components that can variably be dosed thereto. WO 2013/026506 A1 and WO 2014/12791 8 A1 each disclose a melt processing plant having a melt feeder for feeding a melt to a processing head, wherein a start-up valve for carrying off the melt during a start-up or resetting phase such as e.g. from a colored to a not colored melt is disposed between the melt feeder and the processing head. DE 28 47 431 A discloses a device for the dosed addition of liquid additives such as e.g. cross-linking agents to the base material for plastic-insulated cables that are continuously prepared in an extruder. In order that the extruder can continuously be fed with cross-linking agents even if an aggregate forming a dosing device has failed due to a breakdown or the like there are provided two parallel storing containers for one and the same cross-linking agent that are each connected via parallel stopcocks and magnetic stop valves. So, by circumventing the defective aggregate a continuous flow of the cross-linking agent toward the extruder can be ensured.

US 2014/0023743 A1 shows a plant having several module-like replaceable components, in particular several wagons that contain different plastic compositions and several replaceable gravimetric feeders for feeding the extruder. In order to not to make the down time of the plant dependent on the cleaning of the feeders the feeders can be replaced between each change in batch.

In DE 1 604 354 there is disclosed a device for the treatment of thermoplastics. For that, a dosing station is provided, wherein a nozzle can be pivoted between three different treating mixers so that the treating mixers are successively fed.

In DE 1 604 389 there is disclosed a device for the continuous feeding of a mixing unit with cast resin and a curing agent. For that, dosing systems are charged with the same mixture. The ratio of curing agent and resin is adjusted via dosing gates from different containers into common outlet openings.

BRIEF ILLUSTRATION OF THE INVENTION

The invention is based on the object to provide a process for the production of plastic articles in which it is possible to change from one production order for a plastic article to another production order for another plastic article without a significant loss of production time.

This problem is solved by a process having the features of patent claim 1, wherein in a running first production order a second group of dosing stations at the extruder is prepared for a second production order for which a second plastic composition of a second component and at least one associated component that is different from the first plastic composition has to be supplied to the extruder. After completion of the first production order it is reset to the second production order.

Advantageous developments of the invention are given in the dependent patent claims.

The reset can be performed by terminating the supply of the first plastic composition by closing a first shut-off device and starting the supply of the second plastic composition by opening a second shut-off device.

Here, closing the first shut-off device and opening a second shut-off device can be performed at the same time or at a short interval.

Depending on the arrangement of the gates it may be of advantage to empty the height.

The invention enables to significantly shorten the resetting time from one production order to another by filling the second dosage that is inactive during the first production order during the ongoing production with the raw materials for the following order. This is possible with any type of processing means, above all it is possible with an extruder.

All quantities and densities of the raw materials can already be adjusted while the first production order is running. If this order is completed the supply of the raw material on the active dosage, i.e. the first group of dosing stations, is stopped and—optionally after removing the first production mixture—the supply of the so far inactive dosage, i.e. the second group of dosing stations, is opened. Then, the latter is immediately shifted to the active mode and from now on regulates the extruder.

A dosage in its "inactive" stage is preferably completely decoupled from the control of the active dosage.

For example, this can be realized in that the inactive dosage is separated from an electric control. In this way, the inactive dosage can safely be prepared in a manual manner.

An alternative is the possibility to provide a redundant control that is operatively connected to the second inactive control. In this case, there is preferably provided a second screen for controlling the inactive dosage.

It should explicitly be noted that in the context of the present patent application indefinite articles and numerical data such as "one", "two" etc. generally are to be understood as at-least-data, that is as "at least one . . . ", "at least two . . . " etc., unless in the individual case it explicitly or implicitly results that there can or is to be meant only "exactly one . . . ", "exactly two . . . " etc.

Preferably, the shut-off devices are shut-off gates that each are arranged in a common supply line from the first or second group of dosing stations to the extruder.

For a better and safer identification of the active and inactive dosage the shut-off gates can be secured, preferably by recognizing or controlling the current gate positions by using limit switches or RFID chips that are connected to the machine control.

The invention can also be used with plants having several extruders, wherein two dosages or groups of dosing stations per extruder have to be placed. In case of very short order lengths there can also be placed more than two dosages per extruder.

The invention is particularly suitable for the production of plastic articles of free-flowing goods such as e.g. granules and in particular for the production of one- or multi-layered blown films.

On an operating screen of a plant for the production of plastic articles such as e.g. blown films at first one of the two dosages for the extruder regulation is shifted active and the other is shifted passive. So, the operator can prepare all the raw materials during the production of an article on the passive dosage.

At the start-up time of the new production the raw material supply of the active dosage is interrupted via the shut-off gates and that of the so far passive dosage is opened. At the same time the so far active one becomes the now passive dosage for the plant and extruder regulation.

As soon as the new product runs on the plant the operator can discharge the no longer required raw materials from the currently passive dosage and return them to the stock according to the type. Thereafter, the raw materials can be loaded for the following order. This can also be a cleaning material.

In this way, the waste rates are significantly decreased. After switching the dosage the raw materials for the new order reach the extruder within two minutes and one just has to wait until the appearance of the article allows a production. So far, such resettings often took up to 60 minutes, before one could continue with the next product. The process according to the invention produces much less waste and provides significantly more machine utilization in the meaning of an effective production time.

The dosage or group of dosing stations can directly be placed on the extruder, but also in floors above. The passive/active shifting can be handled both manually and by means of a limit switch or RFID chip. Here, the extruder can have one or more openings for the granule supply.

The two or more main components can be the same or different, and one or more of the associated minor components can be the same or different. In any case at least one component of the first plastic composition is different from all the components of the second plastic composition or vice versa. Moreover, the first group of dosing stations can have another number of dosing stations for minor components than the second group of dosing stations.

Preferably, an automatic detection of the flow of the dosages is provided. For example, it can be established by means of flow monitors, which dosage is active and which is not, or also which dosage actually consumes material and which does not.

The following is a description of examples with reference to the drawings.

DETAILED DESCRIPTION OF EXAMPLES

Figure 1:
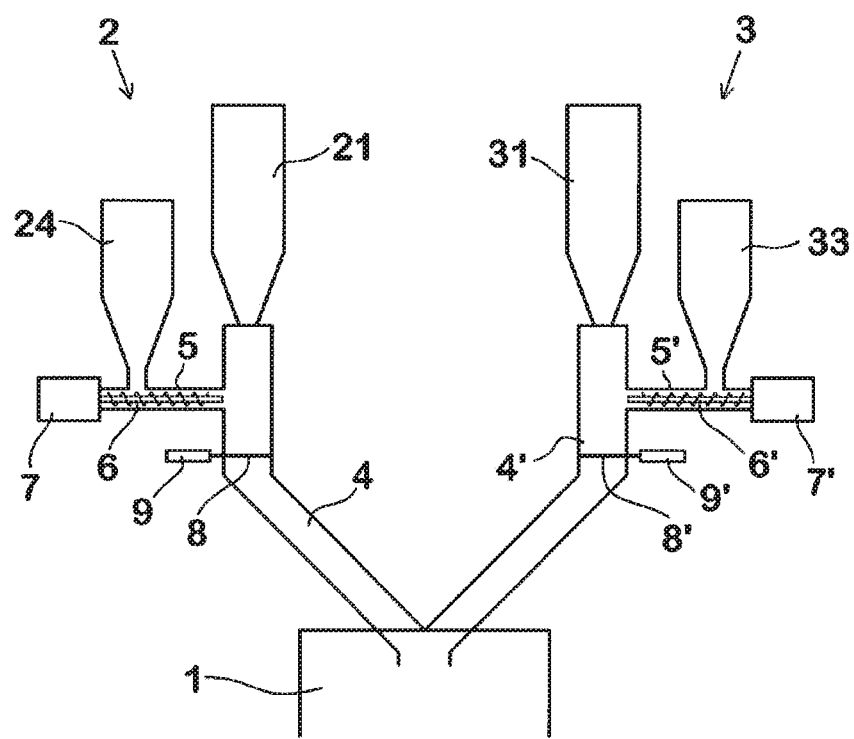
FIG. 1 shows a schematic side view of a blow molding plant.
Figure 2:
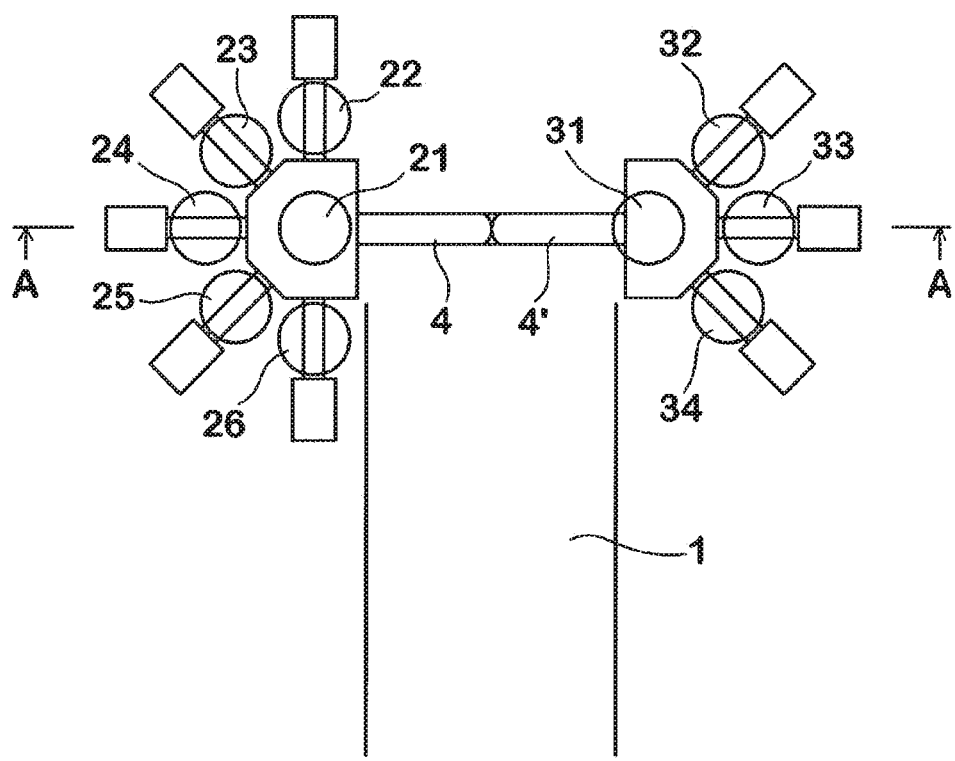
FIG. 2 shows a schematic plan view of the blow molding plant of FIG. 1.

The blow molding plant shown in the figures contains an extruder 1 that can selectively be supplied by two dosages 2 and 3 with one of two different mixtures of plastic granules.

The first dosage 2 comprises a group of six dosing stations to which a dosing station 21 for a main component of a first mixture of plastic granules belongs that is arranged above the extruder 1 and is connected thereto by a downpipe 4.

Horizontal connecting pipes 5 laterally lead to the downpipe 4. In said connecting pipes 5 conveying screws 6 are arranged that—driven by drives 7—convey up to five minor components of the first mixture of plastic granules from five dosing stations 22, 23, 24, 25, and 26 for the minor components into the downpipe 4. The dosing stations 22, 23, 24, 25, and 26 for the minor components are arranged in a semicircle around dosing station 21 for the main component.

The second dosage 3 comprises a group of four dosing stations to which a dosing station 31 for a main component of a second mixture of plastic granules belongs that is arranged above the extruder 1 and is connected thereto by a downpipe 4'.

Horizontal connecting pipes 5' laterally lead to the downpipe 4'. In said connecting pipes 5' conveying screws 6' are arranged that—driven by drives 7'—convey up to three minor components of the second mixture of plastic granules from three dosing stations 32, 33, and 34 for the minor components into the downpipe 4'. The dosing stations 32, 33, and 34 for the minor components are arranged in a semicircle opposite to the dosing stations 22, 23, 24, 25, and 26 of the first dosage 2 around the dosing station 31 for the main component of the second dosage 3.

Below the mixing points of the respective main and minor components in the downpipes 4 and 4' there is a schematically drawn in shut-off gate 8, 8' each that can be opened and closed by a respective drive 9, 9'. The positions of the shut-off gates 8, 8' can be controlled by means of limit switches or RFID chips that are connected to a machine control. The shut-off gates 8, 8' may be opened and closed by a program or by manual input at the machine control.

Assuming there is just running a first production order in which the extruder 1 receives the first mixture of plastic granules from the first dosage 2, wherein the shut-off gate 8 is open and the shut-off gate 8' is closed.

During the production time of the first production order the dosing stations 31, 32, 33, and 34 of the second dosage 3 can be prepared for a second production order that can immediately start after the completion of the first production order. For that, the shut-off gate 8 is closed and the shut-off gate 8' is opened, so that the extruder 1 now receives the second mixture of plastic granules from the second dosage 3.

LIST OF REFERENCE NUMBERS USED 1 extruder
2 first dosage
3 second dosage
4, 4' downpipe
5, 5' connecting pipe
6, 6' conveying screw
7, 7' conveying screw drive
8, 8' shut-off gate
9, 9' shut-off gate drive
21, 31 dosing station for main component
22, 32 dosing station for minor component
23, 33 dosing station for minor component
24, 34 dosing station for minor component
25 dosing station for minor component
26 dosing station for minor component

The invention claimed is:

1. A process for the production of plastic articles in a plant having two groups of dosing stations for an extruder and a control for the groups of dosing stations, the process, comprising:
   supplying a first plastic composition of a first component and at least one associated minor component from a first group of dosing stations, via a first downpipe to the extruder for a first production order; and
   during production time of the first production order, preparing a second group of dosing stations at the extruder for a second production order for which a second plastic composition of a second main component and at least one associated minor component that is different from the first plastic composition is to be supplied to the extruder; and
   after completion of the first production order, switching to the second production order by terminating supply of the first plastic composition to the extruder and starting supply of the second plastic composition to the extruder via a second downpipe,
   wherein the first downpipe and the second downpipe converge at a y connection to an extruder supply pipe, the extruder supply pipe having an exit at the extruder; wherein the supply of the first plastic composition is terminated by closing a first shut-off device in the first downpipe and the supply of the second plastic composition is started by opening a second shut-off device in the second downpipe, wherein closing the first shut-off device and opening the second shut-off device are performed at the same time or in a short interval, such that during the changeover from the first production order to the second production order, there is no interruption in the supply of material to the extruder supply pipe, wherein at least one component of the first plastic composition is different from all the components of the second plastic composition or at least one component of the second plastic composition is different from all the components of the first plastic composition and wherein the first group of dosing station comprises more individual dosing stations than the second group of dosing stations.

2. The process according to claim 1, wherein, during the production time of the first production order, the second group of dosing stations is shifted inactive, so that the dosing stations of the second group can be prepared manually and/or by means of a second control.

3. The process according to claim 1, wherein the switching is done by manually switching a part of the groups of dosing stations.

4. The process according to claim 1, wherein each shut-off device is a shut-off gate.

5. The process according to claim 4, wherein the closing or opening positions of the shut-off gates are detected by means of limit switches or RFID chips and are transferred by means of a machine control.

6. The process according to claim 1, wherein the process is carried out by means of several extruders to each of which a first group and a second group of dosing stations belong.

7. The process according to claim 6, wherein the one or all extruder(s) have more than two groups of dosing stations from which subsequently different plastic compositions are supplied.

8. The process according to claim 1, wherein at least the two main components and/or at least one or all of the minor components are free-flowing.

9. The process according to claim 1, wherein the articles are plastic articles, blown films, cast films, non-wovens, or injection-molded parts.

10. The process according to claim 6, wherein no interruption in the supply of material to the extruder is such that the second production order can start immediately after completion of the first production order.

11. The process according to claim 1, wherein the first shut-off device is closed at substantially the same time that the second shut-off device is opened.

12. A process for the production of plastic articles in a plant having two groups of dosing stations for an extruder and a control for the groups of dosing stations, the process, comprising:
   supplying a first plastic composition of a first component and at least one associated minor component from a first group of dosing stations, via a first downpipe to the extruder for a first production order; and
   during production time of the first production order, preparing a second group of dosing stations at the extruder for a second production order for which a second plastic composition of a second main component and at least one associated minor component that is different from the first plastic composition is to be supplied to the extruder; and
   after completion of the first production order, switching to the second production order by terminating supply of the first plastic composition to the extruder and starting supply of the second plastic composition to the extruder via a second downpipe,
   wherein the first downpipe and the second downpipe converge at a y connection to an extruder supply pipe, the extruder supply pipe having an exit at the extruder; wherein the supply of the first plastic composition is terminated by closing a first shut-off device in the first downpipe and the supply of the second plastic composition is started by opening a second shut-off device in the second downpipe, wherein closing the first shut-off device and opening the second shut-off device are performed at the same time or in a short interval, such that during the changeover from the first production order to the second production order, there is no interruption in the supply of material to the extruder supply pipe.

* * * * *